April 24, 1928.  1,667,628

H. FOTTINGER

DIRECT READING TORSION METER

Filed June 21, 1923  3 Sheets-Sheet 1

Inventor:
Hermann Föttinger
By Julian C. Dowell.
Attorney

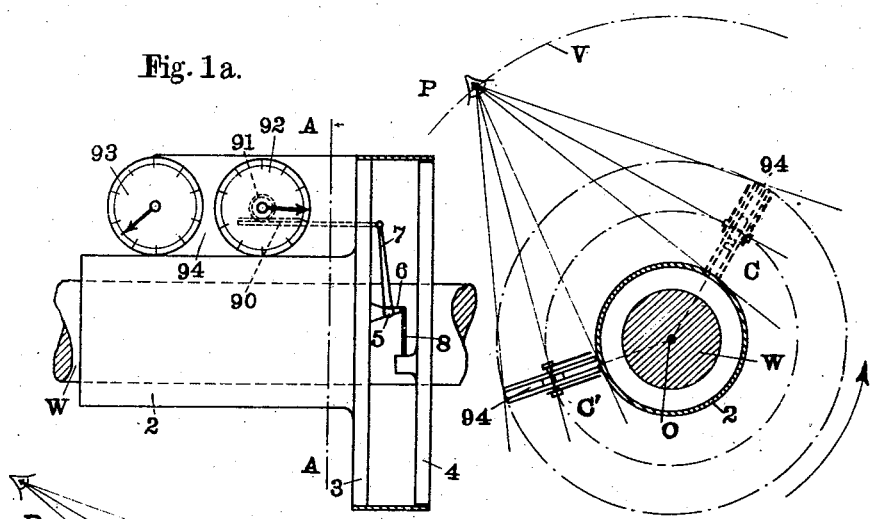
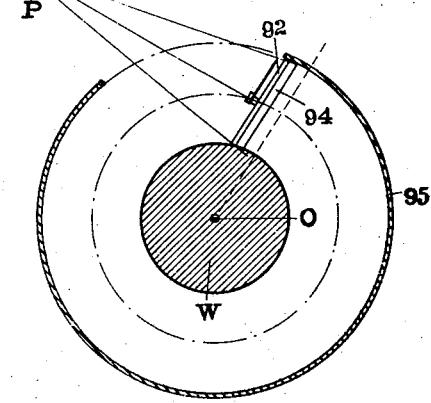
Fig. 1a.
Fig. 1b.
Fig. 1c.

April 24, 1928.
H. FÖTTINGER
DIRECT READING TORSION METER
Filed June 21, 1923
1,667,628
3 Sheets-Sheet 3
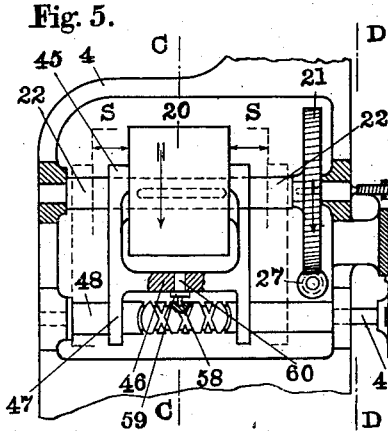
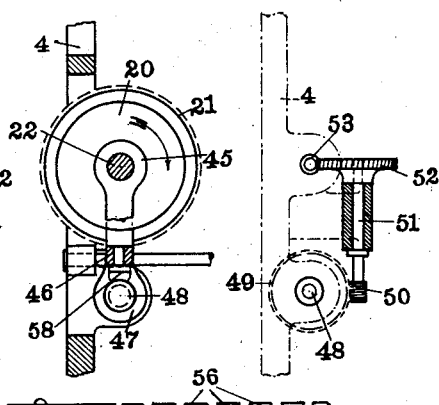
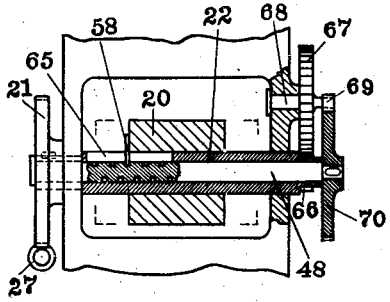
Inventor:
Hermann Föttinger
By Julian C Dowell
Attorney Patented Apr. 24, 1928.

1,667,628

UNITED STATES PATENT OFFICE.

HERMANN FÖTTINGER, OF ZOPPOT, NEAR DANZIG, GERMANY.

DIRECT-READING TORSION METER.

Application filed June 21, 1923, Serial No. 646,963, and in Germany June 26, 1922.

This invention relates to improvements in torsion-meters, integrating torsion-meters, and similar apparatus fitted upon and rotating with power shafts of engine plants and more particularly consists in various features of construction and operation, affording increased accuracy, ease, and simplification.

The object of the invention is to provide multiplying or integrating or averaging means (comprising levers, toothed wheels or racks, planimeter-rollers with their countersurfaces etc.) together with indicating means (such as scales, dials, etc.) upon the rotating shaft in such inter-connection relation to the shaft that the entire indicating device, though rotating at considerable speed, can nevertheless be read directly by the unaided eye.

The solution of this problem is based on the fact that projectiles are clearly visible in their trajectory from certain points, i. e., where they move directly to or from the eye of the observer.

A similar effect is attained with rotary scales, when their reading surfaces are arranged nearly perpendicular to the direction of rotation. They are clearly visible without mirrors, telescopes, stroboscopic disks or slots etc., where their surfaces move rotatingly in a direction nearly perpendicular to itself toward or from the observer.

The multiplication necessary between the torsional arc or angle of the shaft and the rotary scale may be effected by any well known means, such as levers, toothed wheels or racks, rollers, beams of light, hydraulic or electric devices and the like, but with the special feature that, according to my invention, the indications on one or more rotary scales or dials.

By these means the difficult mechanical or optical transmission on writing devices or upon scales, which are stationary outside the shaft is avoided and the accuracy and ease of observation are improved notwithstanding considerable simplification and reduction of cost.

Furthermore, similar improvements are obtained for integrating or averaging torsion meters (horsepower meters), which I have described in various publications.

In the drawings, which form a part of this specification, several constructional embodiments of the invention are illustrated by way of examples.

Figure 1ª is a side elevation, partly in section of a torsion meter with direct reading disks.

Figure 1ᵇ is a vertical sectional elevation on the line A—A of Fig. 1ª.

Figure 1ᶜ is a modified construction similar to Fig. 1ᵇ.

Figure 4 shows an alternative construction of the integrating means in partial section; the axis of the counter surface being radial.

Figures 5, 6 and 7 illustrate supplementary improvements of the planimeter device in side elevation and in cross sections on the lines C—C and D—D, respectively.

Figures 8 and 9 show details of said improvement on a larger scale.

Figures 10 and 11 are modifications of the device shown in Fig. 5.

Figures 12 and 13 are, respectively, an end view and a side elevation of a detail shown in Figure 1.

Similar numerals denote similar parts throughout all figures of the drawing, in which the apparatus is illustrated rather diagrammatically, as the drawing serves the purpose of disclosing the essential features of the invention, while the construction may be varied in different ways.

Figure 1:
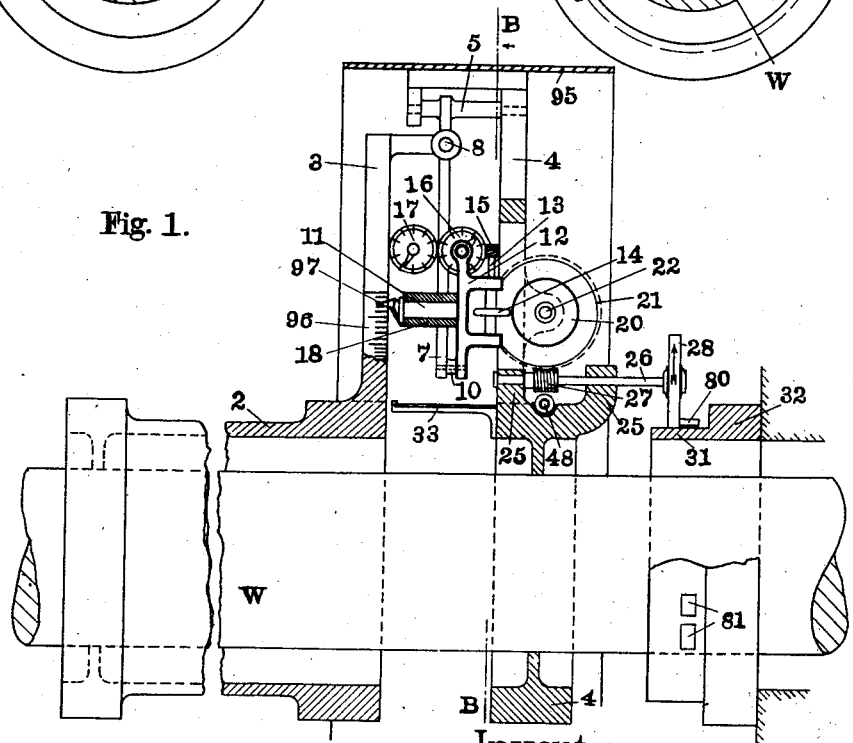
Figure 1 illustrates a longitudinal vertical sectional elevation of a direct reading torsion meter fitted with improved integrating means.

Referring to Figs. 1ª and 1ᵇ, a rotary engine shaft W carries a torsion meter 2, 3, 4 of any well known type (preferably mechanical, or optical, electrical etc.) shown with a measuring tube 2 fixed with one end on the shaft W, (see Fig. 1), with arms or disks 3 and 4 attached to the shaft W, with a bell-crank lever 6, 7 mounted on a pivot pin 5, with a rod 8, a toothed rack 90, and a gear wheel 91 adapted to multiply the small relative rotation of the discs 3 and 4 on torsion of the shaft, and dials 92 and 93 having hands or indexes for the different decimals; the various points of this indicating device describing circles, as can be seen from Fig. 1b.

Dials and hands may be fitted on the front and back side of the indicating devices (see Fig. 1c) in order to obtain readableness on either side of the devices in both directions of rotation of the shaft.

The scales of the indicating device are placed in a plane parallel with (see Fig. 1b), or in the same plane with the axis O of rotation of the shaft (see Fig. 1c), so that all their points, at the place C as well as at the place C' (Fig. 1c), moving for a considerable angle of rotation almost exactly in the direction of circular tangents, can be observed simultaneously by an eye resting at a point of intersection P of the respective tangents of the circles within the visual plane. When the shaft W rotates in the sense of the arrow shown in Fig. 1c, the indication of the hand can be read off the device 94 at C, as the appliance moves towards the point P, or at C', as the appliance there moves away from the point P on a relatively flat arc for a certain extent of the rotation. This reading off can be effected at any point in the circle V and independently of the speed of shaft rotation.

Fig. 1b shows the placing of a dial 92 at a short distance from and parallel to an axial plane through the axis O. Experiments prove the dials to be visible in positions corresponding to those above described with reference to Fig 1c.

The easy reading can further be improved by the application of a screen 95 rotating with the appliance and forming the protecting casing thereof, a sufficiently large opening being provided in said casing 95 in front of the device 94, through which opening the indicating means is visible at a predetermined position, while the other parts which might trouble the eye of the observer by reflection are not visible.

Figure 2:
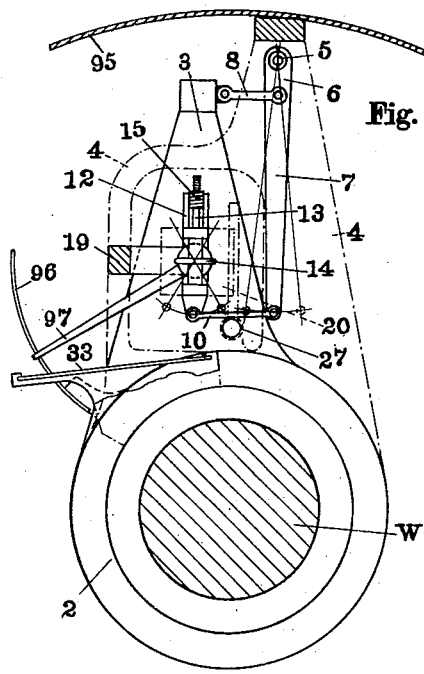
Figure 2 is a cross section on the line B—B of Fig. 1.
Figure 3:
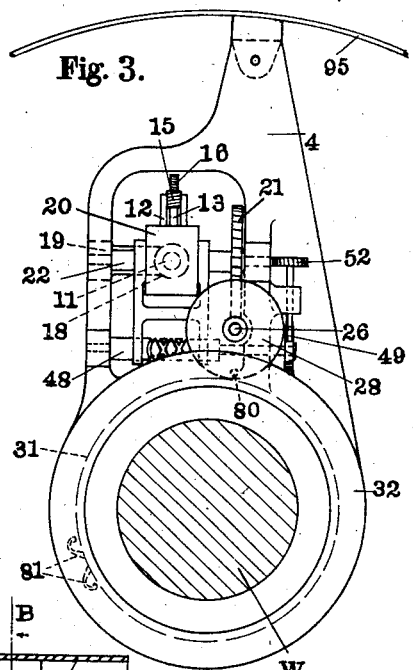
Figure 3 represents a side view of the device from the right end in Fig. 1.

Referring to Figs. 1 to 3 in which in addition to the direct indicating appliance, an integrating torsion meter is shown, 96 is a segmental scale and 97 an index permitting the direct observation of the torsional deflection similarly to the schemes represented above.

The integrating or averaging means embody an improved arrangement of the integrating torsion meter which I have formerly constructed and described in my German Patents Nos. 165,347 and 170,370, comprising multiplying means 5, 6, 7, 8 and a planimeter-roller 14 on an axle 13, rotatably mounted in and turning with a frame 12 which is deflected from a certain neutral or zero-position (shown vertical in Figure 2), in proportion to the torsional moment of the power shaft W, by means of the lever 10. The frame 12 turns upon a pivot pin 11 which is mounted in a bearing 18 fixed on the right-hand arm or disk 4 (Figs. 1 and 3) by means of bracket 19.

The integrating roller 14, frame 12 and pin 11, correspond exactly to ordinary planimeters for averaging the ordinates of diagrams. In the devices hitherto known, this roller is in contact with the surface of a stationary fixed sleeve in the shape of a cylinder co-axial to the power shaft resulting in inaccuracies due to the high sliding and rolling speed, vibrations and other inconveniences.

According to my present invention the planimeter-roller 14 is in contact with a "counter surface", arranged upon the rotary part 4 of the meter and therefore turning with the same about the axis of the shaft W and further rotating relatively to its bearer, its axle being driven by the means hereinafter described in a definite ratio to the speed of the main shaft W In Figs. 1 to 6, 10 and 11 the rotary "counter-surface" is shown as a cylindrical drum 20, fitted on a shaft 22, driven by a worm wheel 21 and worm 27, provided on a shaft 26. Said shaft 26 is journaled in bearings 25 formed upon the part 4 and is rotated by a friction wheel 28, which is in frictional engagement with the periphery of a cylindrical sleeve 31 fixed at 32 to any stationary part, such as a bearing, and surrounding the shaft W. This sleeve may however be placed elsewhere, e. g. surrounding the tube 2.

The number of revolutions of the planimeter roller 14 is proportional to the torsion (i. e. the torsional moment) of the engine shaft W, and to the angular way of the same (i. e its number of revolutions).

Similarly to ordinary plainimeters the indicating means or counter may consist of a small worm 15, keyed to the shaft 13 of the roller 14 and interconnected in well-known manner with one or more toothed wheels provided with dials 16 and 17 for the different decimals. The indicating appliance is supported by the oscillating roller frame 12 and arranged as described hereinbefore in connection with Figs. 1a, 1b and 1c, thus allowing observation of the dials 16, 17 turning with the main shaft W, from a point P located outside the meter. The pointer 97 is attached to the pin 11 and will therefore indicate the multiplied relative displacement of the arms or disks 3 and 4 produced by the torsion of the shaft W, on the scale 96, while the integrating device will indicate the total work transmitted by the power shaft, on the dials 16 and 17.

The apparatus here described operates as follows: When the shaft W is idly running the axis of the shaft 22 lies in the middle plane of the roller 14, which roller is then not rotated, although the drum 20 is continuously driven by the friction gear 28, 31 through the transmission gear 26, 27 and 21, but will slide upon the periphery of the drum. In this operation the index 97 marks "Zero" on the scale 96, and the counting appliance 15, 16, 17 remains inoperative. When under load of the shaft W torsion thereof causes a relative movement of the disks 3 and 4, the multiplying levers 6 to 10 will swing the frame 12 about its pivot 11 and thereby adjust the roller 14 in an angle corresponding to the power transmitted, with respect to the axis of shaft 22, so that the roller will receive a proportional drive and operate the counter.

The accuracy of the integration depends on the exact proportionality of the angular velocity of the "counter-surface" to that of the power shaft W. Therefore the frictionally rolling wheel 28 and the stationary sleeve 31 may be toothed, or, in case of mere frictional contact, as shown in the drawings, according to Figs. 12 and 13, a very simple correction device may be used, comprising a small pin 80, fixed to the friction wheel 28, and one or more pairs of teeth 81, fitted on the stationary sleeve 31. The latter replace expensive toothing by periodically adjusting the exact position of the friction wheel 28 and thus effect compensation for slip and wear.

Figures 5 to 11 show further improvements of this apparatus by providing the "counter-surface" 20 with a slight additional motion to and fro on or with its shaft 22, so that the entire length of the "counter-surface" may gradually be presented to the roller 14, in order to prevent excessive polishing or local wear which would take place when the planimeter roller 14 is in continual contact with a narrow zone of the periphery of the drum. This additional lengthwise movement will of course impart rotation to the roller 14, which in the one direction will advance and in the opposite direction will return the counter by the same degree, so that the total result of counting will not be interfered with.

In Figs. 3 and 5 to 7 the drum 20 is axially moved by the frame 45, 46, 47 which slides along the shaft 22, as well as on the spindle 48. The latter is shown for the sake of clearness, on a larger scale in Fig. 8. It contains a right-handed and a left-handed thread, 55 and 56 respectively, which are connected at their ends by curved grooves 57. The spindle 48 is very slowly rotated by a double worm gear 49, 50, 51, 52, 53 from the shaft 22 of the drum 20. A tooth 58 (see Fig. 9), fitted on, and turning in the frame 46 by the pivot 60 and collar 59, is engaging with the double thread 55 or 56 and moves the frame 45, 46, 47 and the drum 20 alternately to the right and left by the distances S. At the end of either thread, it passes over to the other one through the curve 57.

Fig. 10 represents another constructional form for the same purpose, with a screw spindle 48 turning in and relatively to the hollow shaft 22 of the drum, which is displaced on the shaft 22 by the tooth 58, fixed to the drum 20 and passing through a slot 65 of the shaft 22. The threaded spindle 48 is slowly moved by multiple gear wheel reduction 66, 67, 69, 70.

Fig. 11 shows how the drum 20, fixed positively upon its axle 22, might be axially moved by means of a slowly turning worm wheel 71, provided with a crank pin 72, moving a connecting rod 73. The latter is hinged to the lever 75, 74, 76 engaging with a circumferential groove of the shaft 22.

In some cases, especially when the dials oscillate (Fig. 1), it may be useful to apply besides the direct reading arrangement hereinbefore described, means for indirect reading, such as a mirror 33 which will permit the dials to be seen in the inclined position of the support frame 12.

The constructional embodiments disclosed in the foregoing specification and illustrated in the drawing will make it clear that the invention can be performed in different ways. I, therefore, do not wish to be limited to those examples, but what I claim as my invention is—

1. A rotating torsion meter for direct indication of torsional displacement of a shaft or the like, comprising opposed elements relatively movable in response to torsional displacement of the shaft, mechanism for multiplying the movement of said elements, and means for indicating the extent of the multiplied movement, said indicating means being fixed with relation to said shaft and disposed in a plane perpendicular to the plane of rotation and parallel to and substantially adjacent to a plane passing through the shaft axis of rotation.

2. A rotating torsion meter for direct indication of torsional displacement of a shaft or the like, comprising elements opposingly positioned on said shaft and relatively movable in response to torsional displacement of said shaft, mechanism for multiplying the relative movement between said elements, and an indicator connected to said multiplying mechanism, said indicator being fixed with relation to said shaft and disposed in a plane perpendicular to the plane of rotation and parallel to and substantially adjacent to a plane passing through the shaft axis of rotation.

3. A rotating torsion meter for direct indication of torsional displacement of a shaft or the like, comprising elements opposingly positioned on said shaft and relatively movable in response to torsional displacement of said shaft, mechanism for multiplying the relative movement between said elements, an indicator connected to said multiplying mechanism, said indicator being fixed with relation to said shaft and disposed in a plane perpendicular to the plane of rotation and parallel to and substantially adjacent to a plane passing through the shaft axis of rotation, and a shield for restricting vision of the indicator to a plane tangent to the circle of rotation of said indicator.

4. A rotating integrating power meter for direct indication of power transmission of a shaft or the like, comprising opposed elements relatively movable in response to torsional displacement of said shaft, means varying in response to movement of said elements and to the speed of the shaft for integrating the power transmitted by the shaft, and means for indicating the power integration, said indicating means being fixed with relation to said shaft and disposed in a plane perpendicular to the plane of rotation and parallel to and substantially adjacent to a plane passing through the shaft axis of rotation.

5. A rotating integrating power meter for direct indication of power transmission of a shaft or the like, comprising elements opposingly positioned on said shaft and relatively movable in response to torsional displacement of said shaft, mechanism for multiplying the relative movement between said elements, a drum rotatably mounted on one of said elements, means causing rotation of said drum in proportion to the rotation of said shaft, a planimeter cooperating with said multiplying mechanism and said drum for integrating the power transmitted by said shaft, said planimeter including an indicator for indicating the planimeter reading, said indicator being fixed with relation to said shaft and disposed in a plane perpendicular to the plane of rotation and parallel to and substantially adjacent to a plane passing through the shaft axis of rotation.

6. A rotating integrating power meter for direct indication of power transmission of a shaft or the like, comprising elements opposingly positioned on said shaft and relatively movable in response to torsional displacement of said shaft, a rod pivotally mounted on one element and adapted to shift upon relative movement between said elements, a frame pivotally mounted on one element and adapted to swing upon movement of said rod, a planimeter roller mounted in said frame, a drum rotatably mounted on the other element, said planimeter roller contacting with said drum and being normally perpendicular to the axis thereof, means causing rotation of said drum at a speed proportional to the speed of rotation of said shaft, and an indicator for indicating the travel of said planimeter roller, said indicator being fixed with relation to said shaft and disposed in a plane perpendicular to the plane of rotation and parallel to and substantially adjacent to a plane passing through the shaft axis of rotation.

7. A rotating integrating power meter for direct indication of power transmission of a shaft or the like, comprising elements opposingly positioned on said shaft and relatively movable in response to torsional displacement of said shaft, a rod pivotally mounted on one element adapted to swing with relative movement between said elements, a frame pivotally mounted on one element adapted to swing upon movement of said rod, a planimeter roller mounted in said frame, a drum rotatably mounted on the other of said elements, said planimeter roller contacting with said drum and being normally perpendicular to the axis thereof, means causing rotation of said drum at a speed proportional to the speed of rotation of said shaft, means for shifting said drum laterally to prevent wear, and an indicator for indicating the travel of said planimeter roller, said indicator being fixed with relation to said shaft and disposed in a plane perpendicular to the plane of rotation and parallel to and substantially adjacent to a plane passing through the shaft axis of rotation.

8. A rotating integrating power meter for direct indication of power transmission of a shaft or the like, comprising elements opposingly positioned on said shaft and relatively movable in response to torsional displacement of said shaft, mechanism for multiplying the relative movement between said elements, a drum rotatably mounted on one of said elements, means rotating said drum in proportion to the rotation of said shaft, a planimeter cooperating with said multiplying mechanism and said drum for integrating the power transmitted by said shaft, said multiplying mechanism and said planimeter being positioned substantially radially of said shaft, said planimeter including an indicator for indicating the planimeter reading, said indicator being fixed with relation to said shaft and disposed in a plane perpendicular to the plane of rotation and parallel to and substantially adjacent to a plane passing through the shaft axis of rotation.

9. A rotating integrating power meter for direct indication of power transmission of a shaft or the like, comprising elements opposingly positioned on said shaft and relatively movable in response to torsional displacement of said shaft, a rod pivotally mounted on one element and adapted to swing with relative movement between said elements, a frame pivotally carried on one of said elements and adapted to swing upon movement of said rod, a planimeter roller mounted in said frame, a drum rotatably mounted on the other of said elements in contacting relation with said planimeter roller, the latter being normally disposed perpendicular to the axis of said drum, means causing rotation of said drum at a speed proportional to the speed of rotation of said shaft, said rod and said roller mounting being disposed substantially radially of said shaft, and an indicator for indicating the travel of said planimeter roller, said indicator being fixed with relation to said shaft and disposed in a plane perpendicular to the plane of rotation and parallel to and substantially adjacent to a plane passing through the shaft axis of rotation.

In testimony whereof I have signed my name to this specification.

HERMANN FÖTTINGER.